United States Patent [19]

Irvin

[11] Patent Number: 5,099,706
[45] Date of Patent: Mar. 31, 1992

[54] VARIABLE SPEED TRANSMISSION

[75] Inventor: Peter J. E. Irvin, Surrey, Canada

[73] Assignee: Naja International Inc., Vancouver, Canada

[21] Appl. No.: 454,931

[22] Filed: Dec. 22, 1989

[51] Int. Cl.⁵ ............................................. F16H 21/42
[52] U.S. Cl. ..................................... 74/63; 475/162; 475/16; 475/296
[58] Field of Search ............... 74/63, 393, 394, 750 B, 74/793; 474/49, 50, 69, 70; 475/162, 16, 296

[56] References Cited

U.S. PATENT DOCUMENTS

| | | | |
|---|---|---|---|
| 1,435,838 | 11/1922 | Gill | 74/63 |
| 2,069,007 | 1/1937 | Fontana | 74/393 |
| 2,183,193 | 12/1939 | Husson | 74/124 |
| 3,087,355 | 4/1963 | Bassereau | 74/793 |
| 3,490,299 | 1/1970 | Binner | 74/63 |
| 3,750,485 | 8/1973 | Blakemore | 74/63 X |
| 3,913,749 | 10/1975 | Wyers | 74/63 X |
| 3,995,508 | 12/1976 | Newell | 474/50 |
| 4,181,043 | 1/1980 | Waddington | 475/16 |
| 4,411,165 | 10/1983 | Evans | 74/63 |
| 4,475,412 | 10/1984 | Evans | 74/63 X |
| 4,665,762 | 5/1987 | Russell | 74/63 |
| 4,701,152 | 10/1987 | Dutil et al. | 474/70 |
| 4,800,768 | 1/1989 | Kazuta | 74/63 |

FOREIGN PATENT DOCUMENTS

| | | |
|---|---|---|
| 625053 | 2/1936 | Fed. Rep. of Germany . |
| 3711643A | 10/1988 | Fed. Rep. of Germany . |
| 437830 | 5/1912 | France . |
| 527598 | 10/1921 | France . |
| 718788 | 1/1932 | France . |
| 766638 | 7/1934 | France . |
| 282671 | 2/1931 | Italy . |
| 345007 | 12/1936 | Italy . |
| 60215 | 7/1924 | Sweden . |
| 109085 | 9/1943 | Sweden . |
| 715863 | 2/1980 | U.S.S.R. . |

Primary Examiner—Allan D. Herrmann
Assistant Examiner—David W. Laub
Attorney, Agent, or Firm—Shlesinger, Arkwright & Garvey

[57] ABSTRACT

A variable speed transmission transmits power between an input and output in which a pinion gear, a rotor and a cam are mounted for relative rotation therebetween. First and second gear rack pairs have opposite facing toothed gear racks which are spaced apart sufficiently to receive the pinion gear and cam therebetween when the pinion gear engages at least one of the gear racks, and the outer surface of the cam is adjacent at least one of the gear racks. First and second rack supports support the rack pairs against lateral movement to ensure full engagement between the pinion and sequentially engaged racks. The rack support slidingly engage the rotor to transmit power therebetween in such a manner that a resultant force vector from contact between the pinion and gear rack passes closely adjacent a point of contact between a rack support and a rotor. Teeth of the gears have inclined tips to facilitate meshing.

30 Claims, 6 Drawing Sheets

VARIABLE SPEED TRANSMISSION

BACKGROUND OF THE INVENTION

The invention relates to a fully variable power transmission apparatus in which rotary power applied to an input member is transferred to an output member, with means to permit a continuous or "stepless" change in speed and torque between the input and output members.

Many different types of variable speed power transmissions are available, some types using trains of journalled toothed gears, or chains and sprockets, or pulleys and belts. Many types of transmissions provide a relatively limited speed range or torque ratio, with a number of pre-selected ratios provided between minimum and maximum gear ratios. Such ratios are in so-called "steps" or are discontinuous, i.e. to progress through the full range of gears a series of incremental steps must be taken, intermediate positions between the steps being unattainable. That is, this type of transmission does not provide a continuously variable speed or torque throughout the entire range between minimum and maximum gear ratios.

While attempts have been made to produce "stepless" or continuously variable transmissions, many additional complications are usually introduced often with limitations on maximum power that can be transmitted. A stepless transmission has the advantage of providing continuous variations in torque and speed between input and output members, but usually the range of gear ratios is relatively limited compared with conventional "stepped" transmissions as previously described.

Examples of stepless gear transmissions are shown in U.S. Pat. No. 4,411,165 issued to Evans in 1983 and in U.S. Pat. No. 4,800,768, issued to Kazuta in 1989. While both of these patents disclose stepless transmissions which provide a relatively wide gear ratio range, in the applicant's opinion the designs appear to be limited to relatively low power applications, and it is anticipated that difficulty can be experienced in adapting the patented transmissions to heavy duty application. Both patents disclose an input pinion surrounded by four toothed racks which are connected together as two pairs of oppositely disposed racks, and which transfer power to an output rotor. Spacing between axes of the input pinion and output rotor is variable, and the transmission can be likened to an input pinion driving an output annular gear of variable diameter. The pinion is engaged by the racks in sequence which rotate thereabouts so that there is intermittent meshing between the pinion and the racks in sequence. Both patents disclose resilient means to permit the racks to move radially relative to the pinion.

One problem that appears to be common to both patents is the difficulty of ensuring smooth transfer of torque from the pinion gear to each rack in sequence. As the pinion rotates, each rack is engaged by the pinion in sequence, and thus there is constant engagement and re-engagement of racks by the pinion. Even for a constant speed ratio between the input and output members, difficulty can be experienced when the pinion gradually disengages from one rack, and re-engages with the next rack in sequence. When the gear ratio is actually changing, by changing spacing between axes of the input and output members, the difficulties of ensuring a smooth transfer of torque between the pinion and the racks is increased. Sometimes a tooth of the pinion can come into direct tip-to-tip contact with an opposing tooth of a rack about to be engaged. If this occurs, the resilience provided in the mounting of the rack permits the rack to move generally radially outwardly to some extent, but this movement is often insufficient to prevent high forces from being generated between the pinion and the rack, which can cause damage to the rack. In any event, when such tip-to-tip contact occurs, an impulsive load is inadvertently applied to the rotor, causing intermittent output of power therefrom.

Furthermore, in each of the two said patents, relatively high friction forces can be generated between sliding members, with a corresponding loss of power. Furthermore, the direction of transfer of forces between some adjacent components is less than optimum, significantly increasing mechanical losses in the transmission.

SUMMARY OF THE INVENTION

The invention reduces many of the difficulties and disadvantages of the prior art by providing a "stepless transmission" of a type similar to the two patents above with improved sequential meshing of the racks with the pinion by a specific structure for mounting the racks with respect to the pinion. Furthermore, sliding frictional losses are reduced considerably by improving cooperation between members transferring power from the racks to the rotor. Also force from the pinion transferred to the racks is then directed to the rotor in a more efficient manner than in the patented devices.

A power transmission according to the invention has a body, a pinion gear mounted for rotation about a pinion axis relative to the body, and a cam means having curved inner and outer surfaces. The cam means and the pinion gear are mounted for relative rotation therebetween. The transmission further includes first and second gear rack pairs. Each gear rack pair has oppositely facing toothed gear racks which are spaced apart sufficiently to receive the pinion gear and cam means therebetween when the pinion gear fully engages at least one of the toothed gear racks, and the outer surface of the cam means is adjacent at least one of the oppositely facing toothed gear racks. The transmission also includes first and second rack support means and a rotor. The first and second rack support means support the first and second gear rack pairs respectively against lateral movement of the rack pair relative to the respective support means. This ensures full engagement between the pinion and the respective racks sequentially as required, thus reducing problems associated with sequential engagement between racks of the prior art. The rotor is mounted for rotation about a rotor axis and has rotor engaging means for engaging the first and second rack support means so as to transmit power therebetween.

Also, in a transmission apparatus generally as described above, preferably, each rack support means has oppositely disposed driving sides disposed generally normally to the rack pairs mounted thereon. Each driving side has a driving side inner portion and two driving side outer portions spaced on opposite sides of the respective driving side inner portion. The driving side outer portions project outwardly further from the respective driving side inner portion relative to the pinion. The rotor engaging means include four engaging surfaces disposed as a square about the rotor axis. The two driving side outer portions of each rack support means engage respective engaging surfaces of the rotor to permit relative movement along the engaging surfaces. Preferably, a resultant force vector from contact between the pinion and the respective gear rack passes closely adjacent a point of contact between an adjacent driving side outer portion and the respective engaging surface of the rotor.

Also, in a transmission apparatus generally as described above, the pinion and gear racks have teeth, some of which preferably have obliquely inclined tooth tips. In this way, the teeth generate oblique forces on each other if opposing tooth tips contact each other momentarily prior to full engagement with each other. The oblique forces between the teeth shift the rack teeth generally tangentially relative to the pinion teeth immediately prior to engagement so as to facilitate smooth meshing of the teeth.

A detailed disclosure following, related to drawings, describes a preferred embodiment of the invention which is capable of expression in structure other than that particularly described and illustrated.

DETAILED DISCLOSURE

Figure 1:
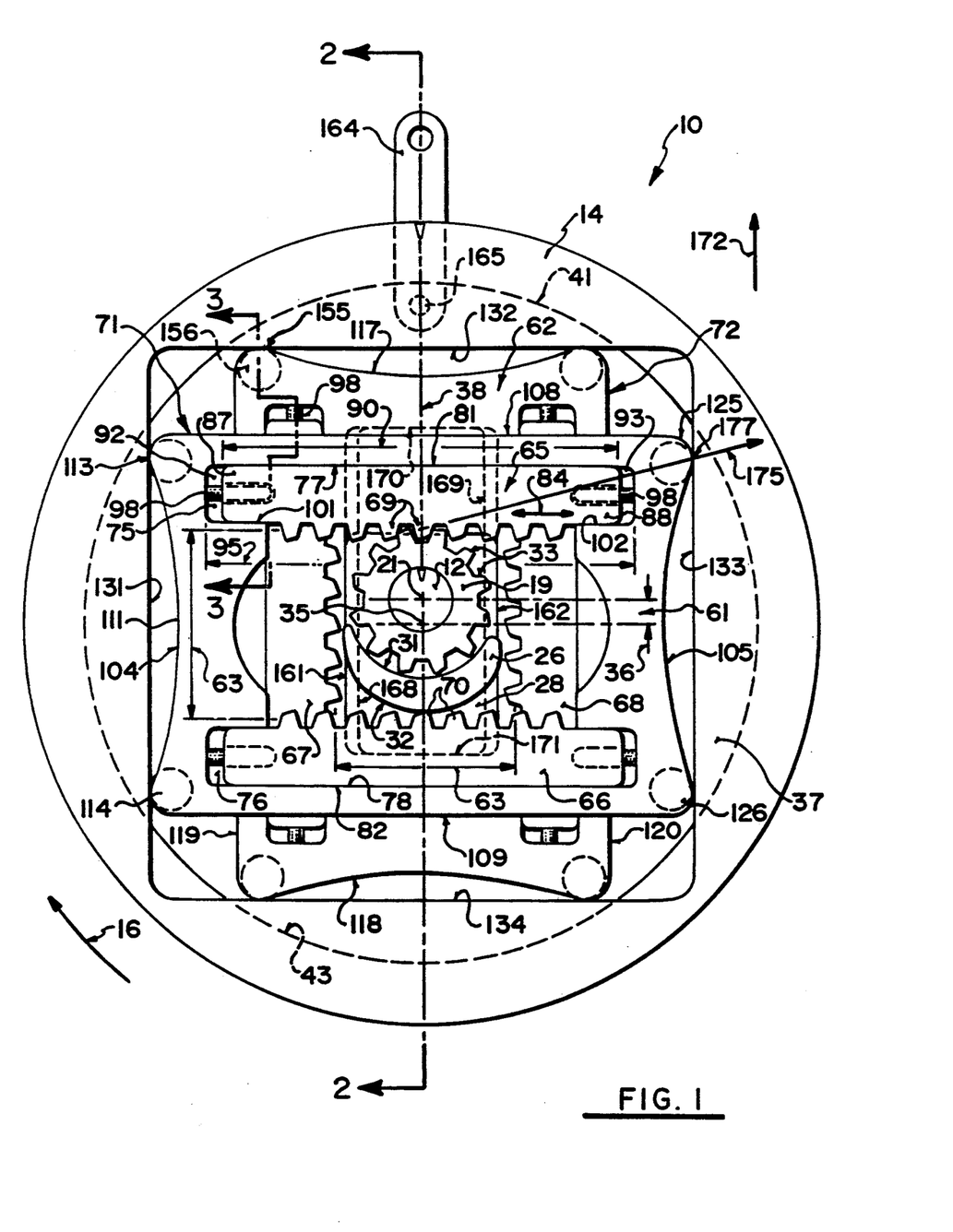
FIG. 1 is a simplified, fragmented, partially diagrammatic, sectional side elevation of a power transmission according to the apparatus, some portions being exaggerated in size or omitted for clarity, the apparatus being shown in a narrowest gear ratio setting.
Figure 2:
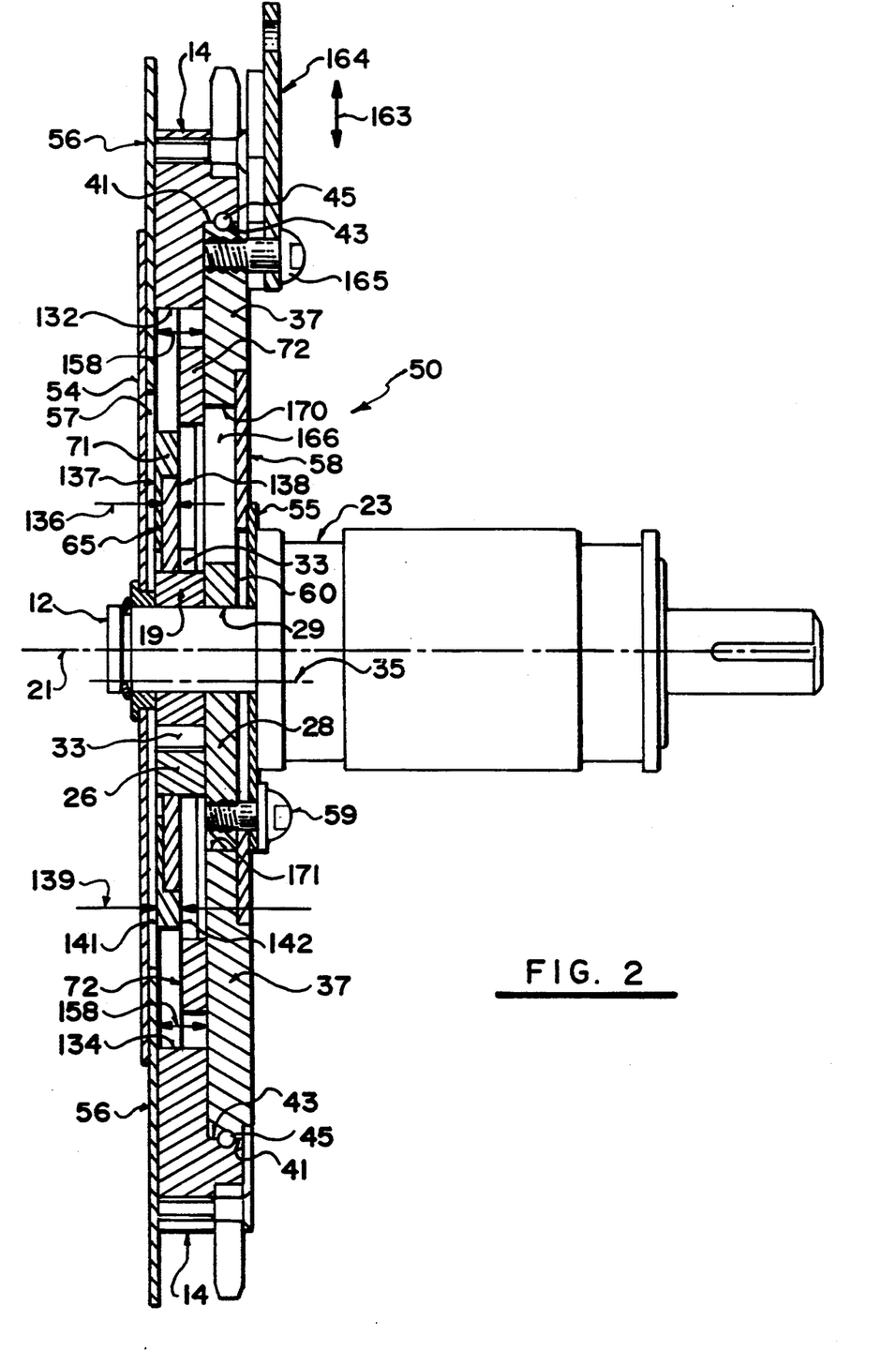
FIG. 2 is a simplified, fragmented diagrammatic section on line 2—2 of FIG. 1, some portions being exaggerated in size or omitted for clarity, the apparatus being shown in the narrowest gear ratio.
Figure 3:
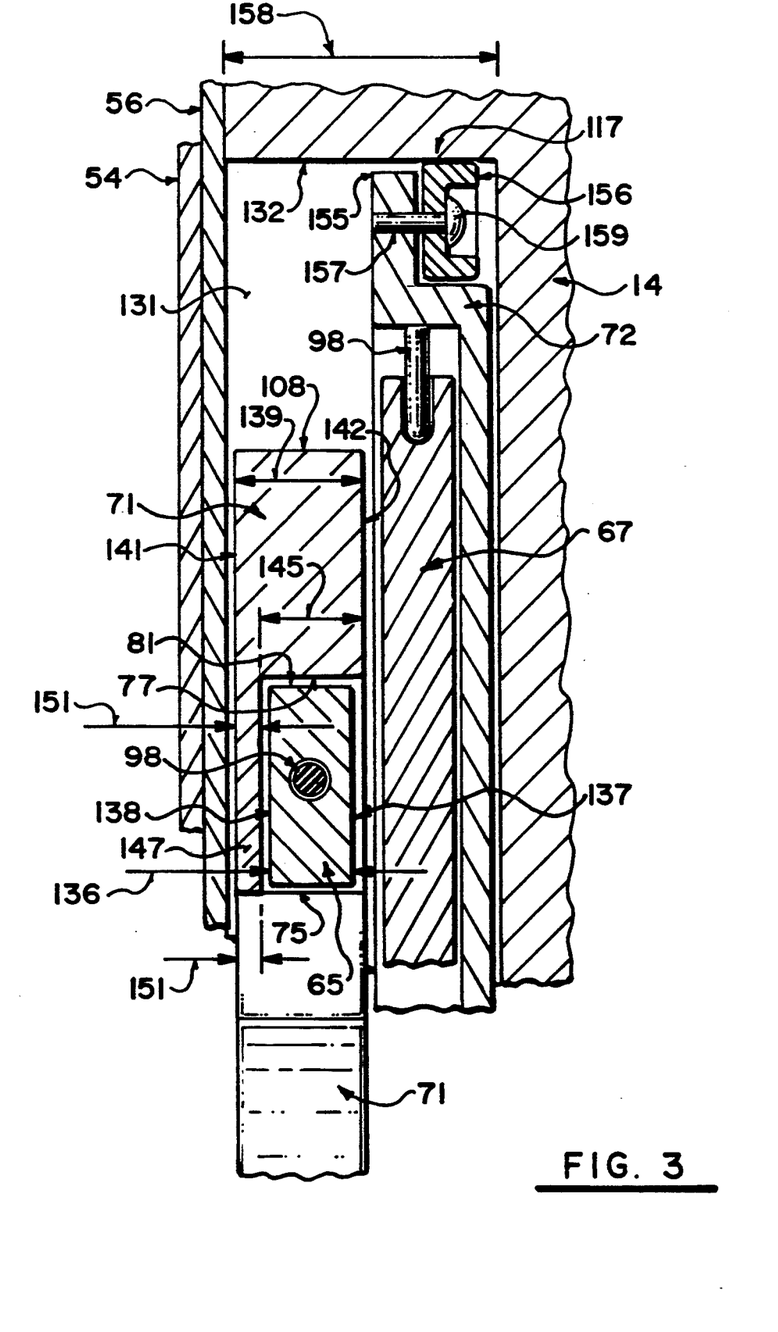
FIG. 3 is a simplified fragmented section on line 3—3 of FIG. 1, some portions being exaggerated in size or omitted for clarity.

FIGS. 1 through 3

A variable speed transmission apparatus 10 according to the invention has an input or pinion shaft 12 and an output rotor 14, and thus is described initially by showing direction of power transmitted through the apparatus from the input shaft 12 to the output rotor 14. Furthermore, for convenience of description, direction of rotation of the input shaft or member 12 is shown as an arrow 16, which is also the direction of rotation of the output rotor or member 14. However, the direction of rotation of the input and output members can be reversed, and direction of power transmission through the apparatus can be reversed i.e., the input and output as disclosed can be interchanged. Also, for convenience of description, some components are shown to be stationary, while others rotate relative thereto. Clearly, in certain applications some of these configurations can be interchanged.

Many components of the apparatus 10 and their function resemble closely equivalent components shown in U.S. Pat. No. 4,800,768, issued to Kazuta as previously described. Consequently, the disclosure of this patent is incorporated herein by reference. However, to clarify understanding of the present invention, even those components similar to the structure shown in Kazuta will now be briefly described. The apparatus includes a pinion gear 19 secured to the shaft 12 for rotation therewith about a pinion axis 21. The shaft 12 is mounted for rotation in a stationary shaft journal 23, and receives power from an external source, not shown.

Referring to FIG. 1, the apparatus 10 also includes a crescent-shaped cam means 26 and a generally rectangular cam mounting means 28 which mounts the cam and has a bore 29 to journal the cam mounting means on the shaft 12. Thus the cam means and the pinion gear are mounted for relative rotation therebetween. The cam means 26 has curved inner and outer cam surfaces 31 and 32, the inner surface 31 being concentric with the pinion axis 21 and being spaced from teeth 33 of the pinion to permit relative rotation therebetween.

The rotor 14 is an annulus and is mounted for rotation about a rotor axis 35 on a disc-like rotor mounting means 37. The rotor axis 35 is spaced from the pinion axis 21 by an axis spacing 36 which, in FIG. 1, is a minimum axis spacing which represents the narrowest gear ratio attainable by the apparatus. As will be described, the spacing 36 between the axes 21 and 35 is variable, and variation of the axis spacing varies gear ratio between the pinion and rotor. The rotor mounting means 37 has a circular rotor bearing surface 41 which is concentric with the axis 35 and complementary to an annular bearing surface 43 of the rotor. Preferably, a plurality of bearing elements such as balls or rollers 45 are provided to reduce friction of the rotor rotating relative to the rotor mounting means. A cam axis 38 coincides with a diameter of the pinion and rotor and thus intersects the pinion axis 21 and the rotor axis 35 and passes through a generally mid position of the cam means 26. The axis 38 clearly serves as a general axis of symmetry of the apparatus, with the exception of the cam means as will be described.

As best seen in FIG. 2, the apparatus has a body 50 which includes the rotor mounting means 37 and also stationary circular first and second body side members 54 and 55 respectively, which have undesignated aligned central clearance openings therein to receive the pinion shaft 12. An outer annular plate 56 is secured to the rotor 14 to rotate therewith, and has an inner clearance opening 57 which is sealed by the first body side member 54, to provide an adequate overlap therewith, similarly to the Kazuta patent. A bolt 59 secures the second body side member 55 to the cam mounting means 28 and also to the stationary shaft journal 23. An inner annular plate 58 is secured to the rotor mounting means 37 so as to move therewith, has a clearance opening 60 which is sealed by the second body side member 55 in a manner similar to that described with reference to the Kazuta patent. Thus, the side members 54 and 55, the cam mounting means 28 and cam means are secured relative to the stationary shaft journal. As will be described, the rotor mounting means 37 is non-rotatably movable relative to the body and journal 23 to permit variation in the axis spacing 36.

As best seen in FIG. 1, the apparatus includes first and second gear rack pairs 61 and 62 respectively, the pairs being disposed perpendicularly to each other and surrounding the pinion gear 19. The first gear rack pair has oppositely facing toothed gear racks 65 and 66 and the second gear rack pair has similar toothed gear racks 67 and 68 respectively. The gear racks and pinion gear have similar meshing teeth, in which the racks are engaged sequentially by the pinion gear as will be described. Inter-rack spacing 63 between opposite gear racks of a pair is equal and critical, and the present invention provides a means of ensuring that there is negligible variation in the said spacing. The gear racks of a particular pair are spaced apart at the spacing 63 which is sufficient to receive the pinion gear 19 and the cam means 26 therebetween when the pinion gear fully engages at least one of the toothed gear racks, for example the gear rack 65 as shown, and the outer surface 32 of the cam means is in contact with at least one of the oppositely facing toothed gear racks, in this instance the gear rack 66. Thus, teeth 69 of the rack 65 are in engagement with the teeth 33 of the pinion, and at least one tooth of teeth 70 of the rack 66 is in contact with the outer surface 32 the cam means.

Again referring to FIG. 1, the apparatus 10 includes first and second rack support means 71 and 72 respectively for supporting the first and second gear rack pairs 61 and 62 respectively against lateral movement of the rack pair relative to the respective support means. This is to maintain the spacing 63 constant, which ensures full engagement between the pinion and respective rack, the engagement occurring sequentially as will be described. The first rack support means 71 has a pair of parallel recesses 75 and 76 respectively disposed on opposite sides of the rack support means and spaced apart on opposite sides of the pinion. The recesses 75 and 76 retain the respective toothed racks 65 and 66 and have respective outer bearing surfaces 77 and 78 which are accurately linear and smooth to reduce sliding friction thereon. The racks 65 and 66 have similar linear outer bearing surfaces 81 and 82 respectively disposed along outer edges of the respective racks opposite to the teeth 69 and 70 of the racks. The outer bearing surfaces 81 and 82 of the gear racks 65 and 66 are in engagement with the outer bearing surfaces 77 and 78 of the respective recesses of the rack support means 71.

The rack 65 has oppositely disposed rack end portions 87 and 88, space between the end portions defining length 90 of the rack. The recess 75 has a pair of oppositely spaced recess end portions 92 and 93 for receiving the rack end portions 87 and 88 respectively. Space between the recess end portions 92 and 93 defines length 95 of the recess, which is greater than the length 90 of the rack retained therein, so as to permit limited longitudinal movement of the rack relative to the rack recess per arrow 84. The ends 87 and 88 of the rack 65 have axially aligned openings which receive similar elongated resilient members 98 therein. Thus a resilient means, which can be made from an elastomeric or rubber compound, is mounted at each end of each rack, each resilient member cooperating with an adjacent end portion 92 and 93 respectively of the rack recess so as to apply an inwards axial force to the rack. The inwards force applied at one end of the rack is opposed by an opposite inwards force at an opposite end of the rack, which tends to center the rack within its recess. Preferably, the length of the recess is slightly more than one tooth width longer than the rack. Thus, when the rack is centered in the recess, it can move in either direction along the recess approximately one half of the tooth width.

The end portions 92 and 93 of the recess 75 have inner edge portions 101 and 102 disposed generally oppositely to the outer bearing surface 77 of the recess. Space between an inner edge portion of the recess and an oppositely facing adjacent end portion of the outer bearing surface of the recess is essentially equal to transverse width of a respective end portion of the rack. There is clearance sufficient only for axial movement of the rack with negligible lateral movement of the rack relative to the recess, thus maintaining the spacing 63 constant for reasons to be described.

The rack 66 is similarly resiliently mounted in the respective recess 76 by a similar structure and is not described. The racks 67 and 68 are similarly resiliently mounted in respective recesses within the second rack support means 72 and are also not described.

The first rack support means 71 is generally rectangular, and has oppositely disposed, slightly inwardly curved driving sides 104 and 105 disposed generally normally to the racks 65 and 66 mounted thereon. The support means 71 also has a pair of oppositely disposed straight, interconnecting sides 108 and 109 which are parallel to the racks 65 and 66 and interconnect the driving sides. The driving side 104 has a driving side inner portion 111, and two driving side outer portions 113 and 114 spaced on opposite sides of the inner portion 111. The driving side outer portions project further outwardly from the inner side portion 111 relative to the pinion and preferably have bearing means to reduce friction and wear as will be described. It can be seen that the driving side 105 is generally similar to the driving side 104 and thus both driving sides are generally concave so as to extend smoothly inwardly to the respective driving side inner portion from the two respective driving side outer portions thereof.

The second rack support means 72 is generally similar to the first rack support means 71 and thus has similar curved driving sides 117 and 118 disposed generally normally to the rack pair 62 mounted thereon, and interconnected by straight interconnecting sides 119 and 120 which are parallel to the rack pair 62. While the driving sides are shown to be concave, any shape which has outer portions projecting further outwardly than the inner portions thereof will suffice.

The rotor 14 has four engaging surfaces 131 through 134 disposed as a square symmetrically about the rotor axis 35. The two driving side outer portions 113 and 114 of the driving side 104 are in contact with the engaging surface 131 of the rotor. Similarly, outer portions 125 and 126 of the driving side 105 contact the engaging surface 133 of the rotor. Corresponding outer portions of driving sides 117 and 118 of the second rack mounting means 72 contact the engaging surfaces 132 and 134 of the rotor as shown partially in FIG. 1. Space between the outer portions of each rack support means, or, if provided, the bearing means thereof, is closely matched to space between oppositely facing engaging surfaces of the rotor to essentially eliminate any relative rotation therebetween, to reduce the chances of "binding" of the rack support means and to limiting the movement thereof to smooth longitudinal movement along the engaging surfaces.

As seen in FIG. 3, the rack 65 has a thickness 136 defined by space between outer and inner side faces 137 and 138 thereof. Also the rack support means 71 has a thickness 139 defined by space between opposite side faces of the rack support means, namely space between an outer side face 141, and an inner side face 142. The recess 75 has a depth 145 less than the thickness 139 of the rack support means. The recess 75 has a recess rear face portion 147 which engages the inner side face 138 of the rack 65. The rear face portion 147 has a thickness 151 which is no greater than difference between the thickness 139 of the rack support means and the thickness 136 of the rack. Thus, when the rack 65 is received in the rack recess 75, the outer side face 137 of the rack does not project beyond, and preferably is slightly recessed with respect to, the adjacent inner side face 142 of the rack support means.

The above relative dimensions provide a dimensional relationship for a rack and its respective rack support means, and a similar dimensional relationship relates to the rack 66 in its recess 76, and the racks 67 and 68 in respective recesses 153 and 154 in the second rack support means 72. As seen in FIG. 3, the recesses of second rack support means 72 face in an opposite direction than the recesses of the first rack support means. In this way, outer faces of the racks 67 and 68 of the second rack support means are closely adjacent outer faces of the racks 65 and 66 of the first support means. This results in the recess rear face portions of each rack support means being disposed oppositely from each other to be exposed on the outside of the pair of rack support means which constitute a self-contained "package" of components for assembly, which are quite well protected. As seen also in FIGS. 2 and 3, the engaging surfaces 132 and 134 of the rotor 14 have a width 158 at least equal to sum of the thicknesses of the first and second rack support means so as to provide adequate engagement therewith.

From the above, it can be seen that the rack pairs of the present invention are mounted in respective rack support means to cooperate with the rotor and the pinion in a manner quite different from that shown in the patents to Evans and Kazuta. In both said patents, the rack means are resiliently mounted to permit some relative lateral movement of the rack, that is movement of the rack that has a generally radial component relative to the pinion gear during engagement. Such generally radial movement relative to the pinion gear has been shown to increase the risk of head-to-head contact between teeth of the pinion and a rack means about to be engaged, as will be shortly described.

As best seen in FIGS. 1 and 3, the driving side 117 of the second rack support means 72 has an outer portion 155 provided with a roller 156 to serve as the bearing means as previously described. The roller 156 is journalled on an axle 157 secured in a recess of the outer portion 155, and an axle stop 159 retains the roller on the axle. A portion of the roller projects beyond the outer portion 155 to contact the engaging surface 132 of the rotor. The three remaining outer portions of the rack support means 72 are similarly provided with rollers to serve as bearing means, which are shown in broken outline. Similarly the outer portions 113, 114, 125 and 126 of the rack support means 71 are also supplied with similar rollers or equivalent means to reduce sliding friction and wear of the rack support means as it moves along the engaging surface as will be described with reference to FIGS. 6 and 7. In most of the following description, for simplicity the rollers adjacent the outer portions of the rack support means are not referred to specifically.

Similarly to the said Kazuta patent, as best seen in FIG. 1 the cam mounting means 28 of the present invention has spaced parallel mounting sides 161 and 162 which are disposed parallel to the cam axis 38 which passes through the pinion axis 21. The rotor mounting means 37 has an elongated rectangular recess 166 having a pair of spaced parallel recess side walls 168 and 169 parallel to the axis 38, and spaced parallel recess end walls 170 and 171 perpendicular to the axis 38, the walls being shown in broken outline. The side walls 168 and 169 engage the mounting side walls 161 and 162 of the cam mounting means 28 to permit relative axial sliding movement between the rotor mounting means 37 and the cam mounting means 28 along the cam axis 38. Because the rotor axis is fixed relative to the rotor mounting means, this axial movement of the rotor mounting means varies the spacing 36 between the pinion axis 21 and the rotor axis 35. A gear shift connector 164 is a short strip aligned with the cam axis 38 and connected to the rotor mounting means 37 by a bolt 165. Axial movement of the strip 164 per a double-headed arrow 163 similarly shifts the rotor mounting means with respect to the cam mounting means 28 so as to vary spacing 36, as will be described with reference to FIG. 4. Thus, the rotor mounting means 37 is non-rotatably mounted relative to the cam means 26 but can move axially relative thereto. The mounting sides 161 and 162, and the recess side walls 168 and 169 have complementary guide means to maintain the axial movement within a main plane of the rotor 14. Thus the rotor mounting means 37 is mounted for guided movement along the cam axis 38 with negligible lateral deviation therefrom. It is seen that the rotor itself is movable along a radius passing through the pinion axis.

As seen in FIG. 1, the curved outer surface 32 of the cam means 26 is asymmetrical with respect to the cam axis 38. This contrasts with the cam means shown in the two prior art patents which are symmetrical with respect to the corresponding axis. The surface 32 is asymmetrical because the gear racks have teeth which are asymmetrical and have obliquely inclined tooth tips as will be described with the reference to FIGS. 5 and 6.

Figure 4:
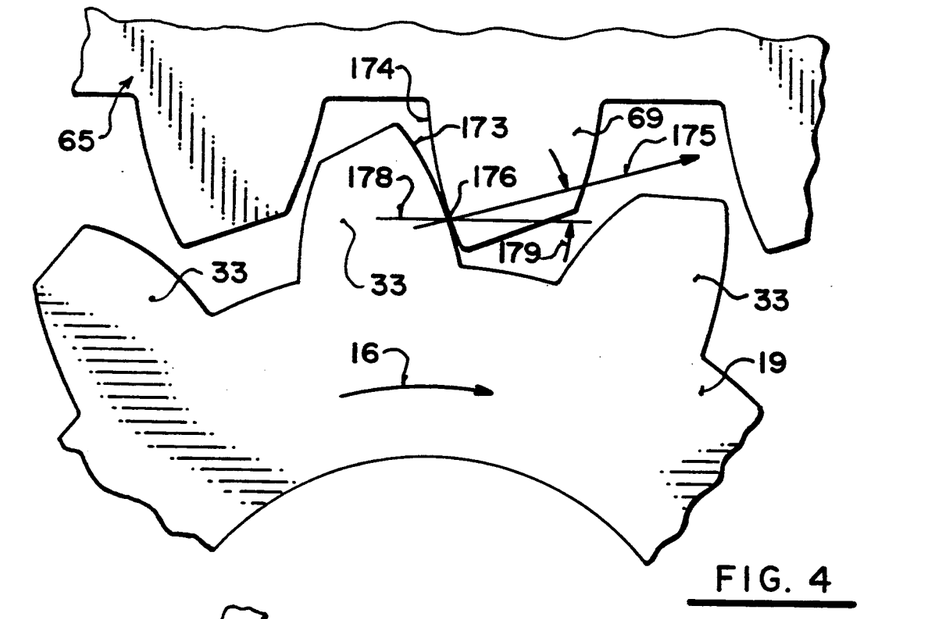
FIG. 4 is a simplified, fragmented side elevation of teeth of a pinion gear and a gear rack in full driving engagement.

FIGS. 1 and 4

The teeth of the gear racks 65 through 68, and the teeth 33 of the pinion have generally standard involute tooth form for driven or driving faces of the teeth, with modified tooth tips as will be described with reference to FIG. 7. Face profiles of the teeth function in a normal manner as below.

Referring particularly to FIG. 4, a known resultant force vector 175 is generated at a point of contact 176 of a side 173 of a particular driving tooth 33 of the pinion gear 19 with a side 174 of an engaged driven tooth 69 of the respective rack 65. As seen in FIG. 1, the vector 175 passes closely adjacent a point of contact 177 between the adjacent driving side outer portion 125 and the respective engaging surface 133 of the rotor. As is well known, the angle of the resultant force vector is dependent on the "pressure angle" of the involute tooth form, which in this instance is 20 degrees. Consequently, the resultant force vector 175 is inclined at an angle 179 of 20 degrees to a tangent 178 passing through the point of contact 176 of the teeth, i.e. it is inclined at 20 degrees to a line normal to the cam axis 38 or is inclined at 20 degrees to a longitudinal axis of the rack. Clearly, there will be some variation in the actual direction of the resultant force vector and the point of contact 177 is selected to be generally in line with the resultant force. This enables the force from the pinion, applied to the rack and thence to the rack support means to be applied at an essentially maximum radius from the pinion axis, thus ensuring essentially optimum transfer of force in the pinion to the rotor. This is a considerable improvement of driving force application and direction when compared with the said prior art.

As will be described with reference to FIGS. 5 and 6, the resultant force vector 175 can be resolved into two components of force, namely a major component disposed at 90 degrees to the engaging surface 133 which applies a driving force to the rotor to generate torque, and a minor component parallel to the engaging surface 133 which applies a force to the rack support means 71 in the direction of an arrow 172. When the pinion first engages the rack 65, the first rack support means initially moves relative to the engaging surface 133 in direction of the arrow 172, and thus is assisted by the minor component of force.

Figure 5:
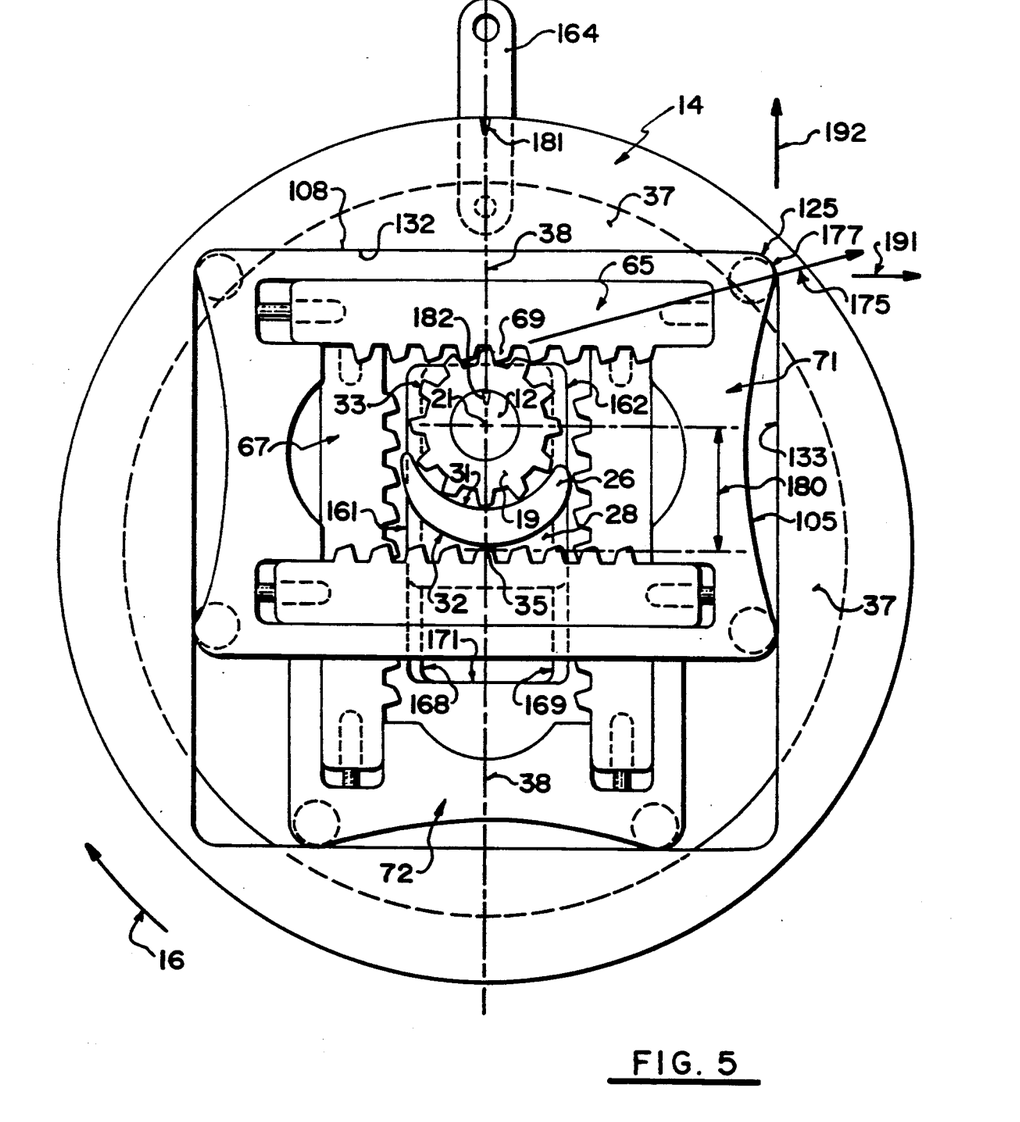
FIG. 5 is a simplified, fragmented diagrammatic side elevation of the apparatus shown with the pinion engaging a single rack, the apparatus being shown in a widest gear ratio setting.

FIG. 5

The apparatus 10 is shown in a widest gear ratio configuration between the rotor and pinion in which the pinion and rotor axes 19 and 35 are spaced apart by a maximum spacing 180. Similarly to the apparatus described in the Kazuta patent aforesaid, the gear ratio of the present invention can be changed by actuating the gear ratio change means or shift connector 164 which causes the rotor to shift relative to the pinion by relative sliding between the sides 161 and 162 of the cam mounting means, and the side walls 168 and 169 of the rectangular recess in the rotor mounting means. As previously described, the rotor can shift diametrically relative to the rotor mounting means and attain any position intermediate the minimum and maximum spacing between the axes 21 and 35, to attain any intermediate gear ratio as in a "stepless transmission".

The resultant force vector 175, generated by contact between the pinion teeth 33 and the rack tooth 69 again passes closely adjacent the outer portion 125 of the driving side 105 where it contacts the engaging surface 133 of the rotor. Clearly, as the rack support means 71 moves relative to the rotor 14, the point of contact 177 similarly moves, and the force vector 175 moves with it. Thus, for the two extreme positions of the rack support means with respect to the rotor, as shown in FIGS. 1 and 5, the point of contact 177 is intersected by, or is closely adjacent, the force vector 175, thus ensuring efficient transfer of force to the rotor.

As briefly described previously, the resultant force vector 175 has a major force component 191 inclined normally to the engaging surface 133 of the rotor, and a minor force component 192 inclined parallel to the surface 133. As the pinion rotates and first drives the rack 65, the minor force component 192 applies a force to the rack support means 71, which initially moves in direction of the arrow 172 until the interconnecting side 108 contacts the engaging surface 132 of the rotor as shown in FIG. 5. This contact occurs when the pinion is about half-way along the rack 65 and represents the outer limit of travel of the rack support means 71 with respect to the rotor. The side 108 remains in contact with the surface 132 until the transfer of force between the rack 65, which is presently engaged by the pinion, to a following rack 67, which is about to be engaged by the pinion, as will be described with reference to FIG. 6. It is added that the interconnecting sides of the rack support means only contact the engaging surfaces of the rotor when in the widest gear ratio setting. For a narrower ratio (eg. as shown in FIG. 1) the displacement of the rack support means relative to the rotor is considerably reduced and the rack support means reciprocate between close outer limits without the interconnecting sides contacting the engaging surfaces.

The rotor has a rotor index mark 181, and the pinion has a pinion index mark 182, shown in a datum position in which the two marks are coincident with the cam axis 38, and are both positioned in a "12 o'clock" position. This establishes a datum from which the gear ratio is to be determined, with reference to FIG. 6.

Figure 6:
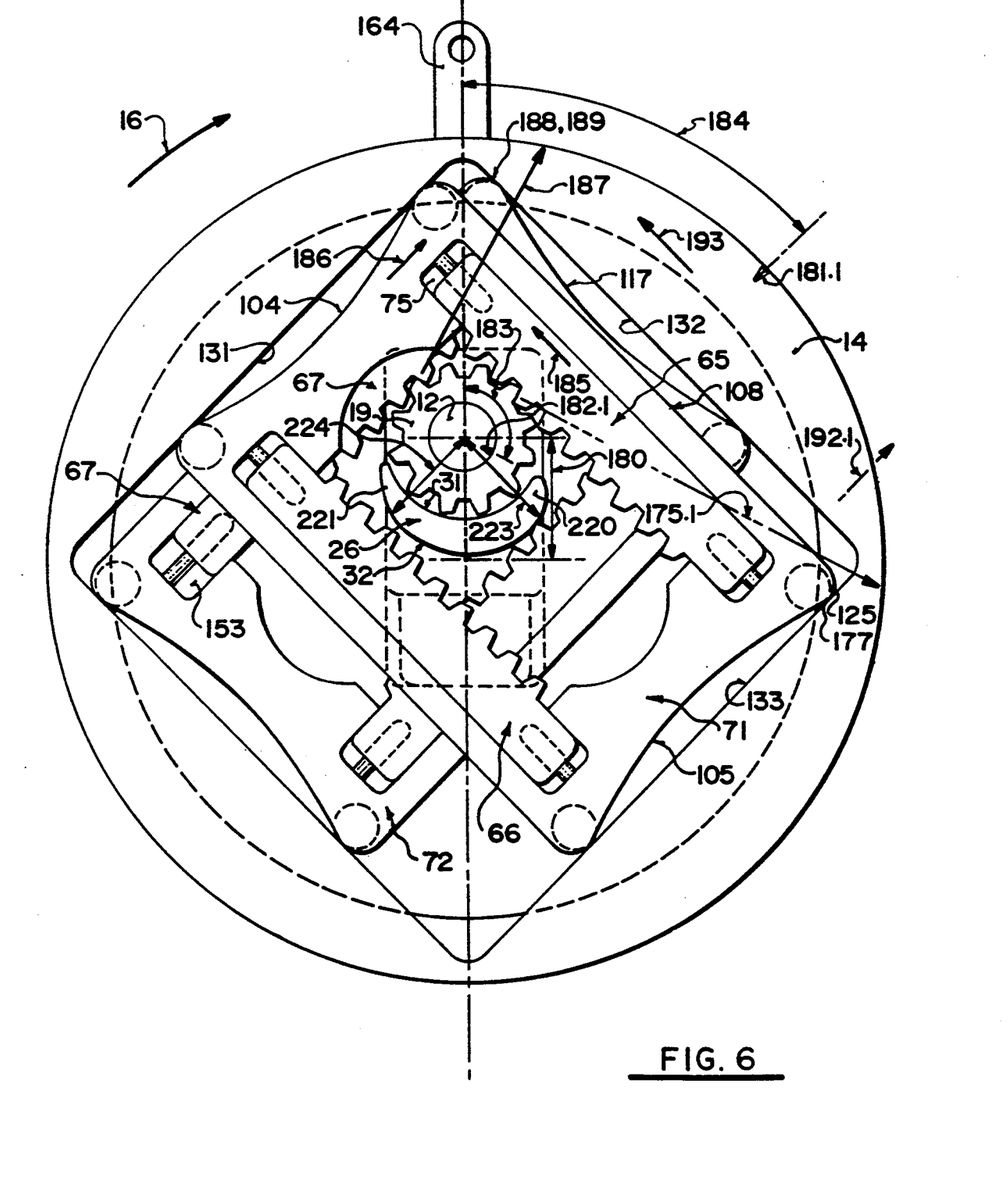
FIG. 6 is a simplified, fragmented diagrammatic side elevation of the apparatus shown with torque momentarily being transferred from one rack to an adjacent rack, with the apparatus being in the widest gear ratio setting and rotated from the position shown in FIG. 5.

FIGS. 5 and 6

In FIG. 5, the index marks 181 and 182 are shown in initial positions on the axis 38, i.e. both marks are shown at 12 o'clock. In FIG. 6, the pinion gear 19 has rotated through an angle 183 so that the pinion mark 182 has assumed a new position 182.1 at approximately 4 o'clock. In consequence, the rotor 14 has rotated through an angle 184 and the index mark 181 has assumed a new position 181.1 at approximately 2 o'clock. The gear ratio between the two marks is thus approximately 3:1, which represents the widest gear ratio for this specific example as described, in which the pinion axis 21 is spaced from the rotor axis 35 by the maximum axis spacing 180. Clearly, increasing diameter of the rotor and lengths of the engaging surfaces 131-134 of the rotor would increase this ratio.

In FIG. 6, the pinion gear 19 is shown in transition and is essentially simultaneously disengaging from the "leading" rack 65, and engaging the "following" rack 67, which is the next rack in sequence as the rotor rotates per the arrow 16. A very short period of time before the configuration shown in FIG. 6, the rack 65 was under load, the interconnecting side 108 contacted the surface 132 and the resultant force vector 175.1, shown in broken outline, passed closely adjacent the point of contact 177 of the outer portion 125 with the engaging surface 133 of the rotor recess. When the rack 65 is unloaded from force from the pinion gear, the rack moves in direction of an arrow 185 to be re-centered within the respective recess 75 due to the resilient means acting at opposite ends thereof. In contrast, after the rack 67 has been synchronized for smooth meshing with the pinion and is subjected to force the rack 67, the rack 67 moves in a direction of arrow 186 to be moved to a right hand end of its respective recess 153, as viewed in FIG. 6. A second resultant force vector 187 from contact between the pinion gear 19 and the rack 67 passes closely adjacent a point of contact 189 between an outer portion 188 of the driving side 117 of the second rack support means 72 and the engaging surface 132 of the rotor 14.

Referring again to FIG. 6, just prior to the relative positions as shown, the resultant force vector 175.1 from contact between the pinion and the rack 65 has a minor component of force 192.1 acting in direction as shown. This minor component acts on the rack support means 71 to hold it against the surface 132. As the pinion disengages the rack 65 and starts to engage the rack 67, the minor component is reduced to zero and the support means 71 reverses direction and moves away from the engaging surface 133 as shown. When force from the pinion is fully transferred to the rack 67, the resultant force vector 187 has a minor force component 193 which acts on the second rack support means 72, moving it in direction of the arrow 193, until it contacts the engaging surface 131 of the rotor.

Thus, in all positions of the rack support means, the resultant force vector generated from contact between the pinion and rack teeth acts to transfer force from the pinion and rack to the rotor at a generally enhanced leverage position from that shown in the previous patents. Also, in all gear ratio settings, a minor component of force of the resultant force vector initially acts on the particular rack support means so as to assist in moving the rack support means in the direction of the minor component until an outer limit of travel of the rack support means is reached. This initial direction is in the same direction of movement of the rack support means along the engaging surface due to operation of the apparatus. Thus, the minor force component, which is inevitable in any gear transmission of this general type, for a major portion of the operation acts on the rack support means in a direction so as to assist in movement of the rack support means.

In FIG. 6, it can be seen that the pinion 19 is meshed instantaneously with teeth of the adjacent racks 65 and 67. If the apparatus were stopped in this configuration, because the pinion engages both racks, relative lateral motion between the pinion and racks is prevented and thus the rotor cannot be shifted with respect to the cam mounting means. Thus, when the apparatus is stationary in this "double meshed" configuration, the gear ratio cannot be changed. In practice, even though double meshing occurs four times per revolution of the rotor, it does not appear to be a problem as the apparatus quickly attains a configuration in which the gear ratio can be changed.

Figure 7:
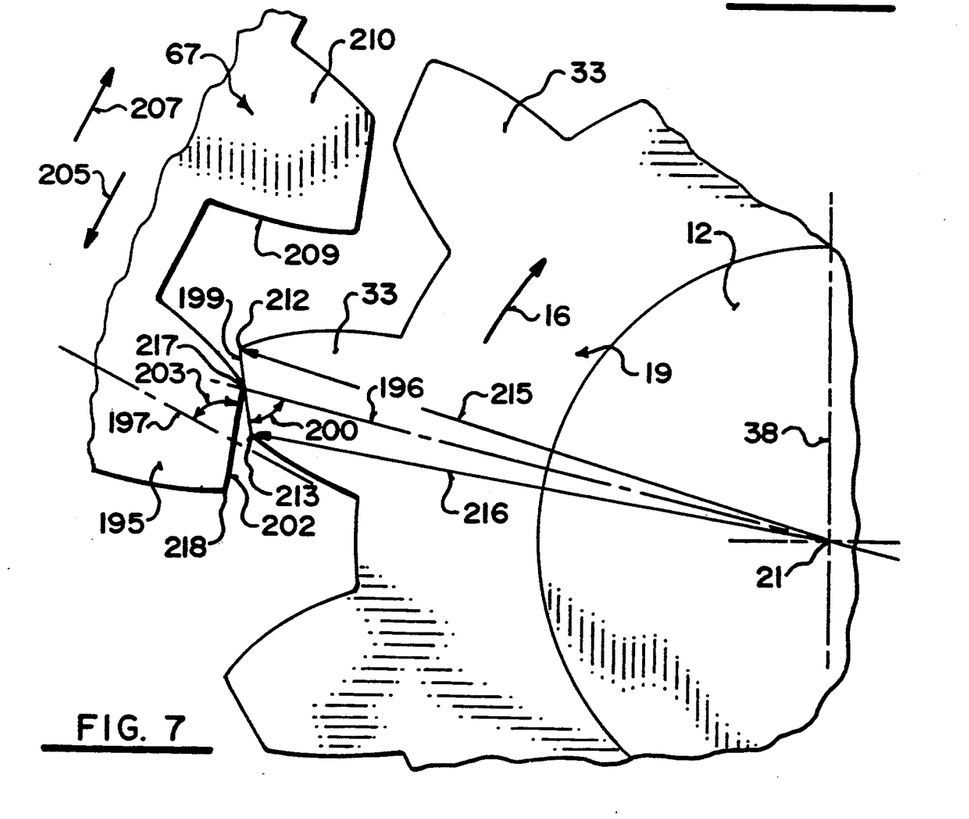
FIG. 7 is a simplified, fragmented side elevation of teeth of the pinion gear and rack shown in tip-to-tip contact momentarily prior to full engagement between the teeth.

FIGS. 6 and 7

FIG. 6 shows a driving configuration an instant of time after transfer of force between adjacent racks 65 and 67, in which teeth of the pinion 19 have fully engaged the following rack 67. In an ideal situation with accurately manufactured components, smooth transfer of drive between the leading rack and the following rack can occur with negligible interference between the teeth. However, in some circumstances tip-to-tip contact between teeth can occur momentarily prior to full engagement of the teeth. The present invention provides tips of the teeth with a modified form or geometry which is designed to essentially eliminate the possibility of damage resulting from tip-to-tip contact between teeth. With the present invention, if tip-to-tip contact occurs, it occurs for a fraction of a second only under negligible load, and results in relative movement between the rack teeth and pinion teeth, so that synchronized meshing can occur before a full load is applied to the following rack which is just being engaged.

In contrast, in prior art structures if tip-to-tip contact between teeth occurs for a sustained length of time, full load was applied to the following rack with a considerable magnification of force from the pinion tooth to the rack tooth, commonly resulting in damage to the rack, and possibly the pinion. Thus sustained tip-to-tip contact of prior art devices must be eliminated for efficient use of the present mechanism, and the inclined tooth tips of the present invention as will be described alleviate this problem.

FIG. 7 shows instantaneous tip-to-tip contact between a typical pinion tooth 33 and a typical rack tooth 195 of the rack 67. The teeth 33 and 195 have respective main longitudinal axes 196 and 197 respectively, the axis 196 being a radial axis passing through the pinion axis 21 and the axis 197 being disposed normally to a longitudinal axis at the rack 67, not shown. The pinion tooth 33 has a tooth tip having a tip end face 199 which is inclined at an angle 200 to the axis 196. The rack tooth 195 has a tip having a tip end face 202 which is inclined at an angle 203 to the axis 197. It can be seen that the tip end faces of teeth are obliquely inclined and generally straight, and radiused at opposite ends thereof to blend smoothly with adjacent faces of the teeth.

As shown in FIG. 6, as the pinion transfers force from the rack 65 to the rack 67, in some instances initial contact between the pinion teeth and the teeth 195 of the following rack to be engaged can be generally of the type shown in FIG. 7. The obliquely inclined tooth tips are shaped relative to each other so as to generate oblique forces on each other if opposing tooth tips contact each other momentarily prior to full engagement with each other. As can be seen, oblique forces are generated on the tooth tip end face 202 which shift the rack 67 generally tangentially per an arrow 205 relative to the pinion teeth. This shift is generally "in reverse" to normal rack movement and occurs immediately prior to full engagement of the teeth so as to facilitate the meshing of the teeth. The rack 67 shifts initially rearwardly because the pinion gear 19 is the input and is rotating at a constant velocity. Because the rack 67 is resiliently mounted, initially the rack is free to shift to accommodate misalignment of the teeth by shifting axially relative to the respective rack support means. The resilient means, which otherwise tend to center the rack within its recess, thus yield to accommodate the forces and provide limited rearward axial shifting of the rack in response to the oblique forces generated on the tooth tips. In most situations of even slight tip-to-tip contact, the rack would tend to shift in direction of the arrow 205 to permit the pinion tooth 33 to continue its rotation whereupon it assumes a position forward of the said tooth 69, to attain a relative position as shown in FIG. 4. The resilient means cooperating with the rack would thus be required to allow the rack to shift approximately one half tooth width from center, to permit such engagement, after which the rack end portion contacts and is held against the recess end portion.

After the rearward shifting of the rack, a driving force from the pinion is applied to a side 209 of an adjacent tooth 210 which shifts the rack 67 in direction of an arrow 207 which is opposite to the arrow 205. Thus, from the first instance of tip-to-tip contact between the teeth, the force acting on the rack 67 shifts from a rearward direction per arrow 205 to a forward direction per arrow 207. As full engagement of the teeth occurs, the rack 67 shifts to compress the resilient means at a forward end of the rack, after which full force is transferred to the rack support means, and thence to the rotor. Clearly, the above description occurs in a fraction of a second and results in negligible fluctuation of driving force applied to the rotor.

The pinion and rack teeth as shown both have oblique tooth tip end faces 199 and 202, inclined at similar angles 200 and 203 respectively which are approximately 70 degrees, but can be between 85 degrees and 45 degrees to longitudinal axes of the teeth. For manufacturing simplicity, it may be preferable to use conventional involute tooth forms for either the pinion or the racks, and thus if preferred, only one set of teeth need be modified, that is either the pinion teeth or the rack teeth. If the pinion teeth are modified, geometry of the pinion teeth is as follows. The pinion tooth has a leading end portion 212 and a trailing end portion 213 with respect to a direction of rotation of the pinion gear, shown per arrow 16. The leading end portion is spaced at a radial distance 215 from the pinion axis 21, which is greater than spacing 216 of the trailing end portion 213 from the pinion axis. Thus the tip end face 199 of the pinion effectively has a clearance angle similar to a clearance angle of a rotating single point cutting tool. Similarly, the rack tooth 195 has a leading end portion 217 and a trailing end portion 218 with respect to direction of movement of the rack under forward driving load. i.e. per the arrow 207. The leading end portion 217 is spaced at a distance from the rack axis, not shown, which is less than a similar spacing of the trailing end portion from the rack axis.

Because the tip end faces of the rack teeth are asymmetrical, the profile of the outer cam surface 32 is similarly asymmetrical as seen in FIG. 6. The outer cam surface 32 has a geometrical profile which reflects a locus of contact between tooth tips of a non-engaged rack sweeping past and contacting the outer surface, while a diametrically opposed rack is engaged with the pinion means. The process of generation of the geometrical profile of the surface 32 follows standard tooth profile generation practice and is not discussed further. It is added that tightly controlled clearances are necessary to ensure smooth meshing.

It appears that, because the inwardly projecting trailing end portions of the rack teeth sweeping the surface 32 are displaced towards the right hand side of respective tooth axes as seen in FIG. 6, the outer surface 32 of the cam means is enlarged towards the right hand end of the cam means when compared with the left hand side. Thus, with respect to rotation of the pinion 19, the cam profile resembles to some extent a highly cambered aerofoil section in which a leading end thereof, designated 220, has a greater cross-sectional area than a trailing end thereof, designated 221. Clearly, in this definition the leading end is approached and passed by a particular pinion tooth prior to the trailing end. Because the inner cam surface 31 is concentric with the axis 21, the outer cam surface 32 is disposed at a greater radial distance 223 from the pinion axis 21 adjacent the leading end 220 thereof than an equivalent radial distance 224 adjacent the trailing end 221 thereof.

OPERATION

The apparatus 10 operates generally similarly to the apparatus described in the aforesaid Kazuta patent, with important exceptions as previously referred to, and as briefly described as follows. Referring to FIG. 1, the input or pinion shaft 12 is rotated per arrow 16 and is engaged with the rack 65 which compresses the resilient member 98 so that the rack 65 moves into the recess end portion 93 to contact the end face thereof. Force from the pinion is transferred as the resultant force vector 175 through the point of contact 177, which results in rotation of the rotor 14. If an outwards force is applied to the gear shift connector 164, the rotor mounting means 37, and with it the rotor, move outwardly radially along the axis 38 so as to increase the spacing between the axes 19 and 35, to eventually attain the widest axial spacing 180 as shown in FIG. 5. This represents the widest gear ratio. In both FIGS. 1 and 5, the rack support means 71 is shown stationary at a limit of its travel from the pinion axis 19.

Referring to FIG. 6, after rotation of the pinion axis through the angle 183, the racks have swung through an angle of approximately 45 degrees as shown, and force from the pinion to the rack 65 is rapidly decreasing to zero, while force on the rack 67 is rapidly increasing to generate the resultant force 187 which passes closely adjacent the point of contact 189 of the driving side outer portion 188 with the engaging surface 132. It can be seen that, irrespective of whether the racks are in a wide ratio position, or a narrow ratio position, fully engaged by the pinion, or partially engaged by the pinion, the point of contact of the rack support carrying that rack is essentially intersected by a resultant force vector generated by force between the pinion teeth and a particular rack tooth in contact.

It is to be understood that, if the direction of rotation of the input shaft 12 were reversed, so that power was applied to the shaft 12 in a direction opposite to the arrow 16, the angle of the tips of the teeth of the pinion and/or the racks would similarly be reversed. Also, if the input power were applied to the rotor 14, corresponding changes in the angle of the teeth would be required, depending on the direction of rotation.

It can be seen that the four racks function unitarily as an internal ring gear of varying diameter to vary gear ratio between the input pinion and the output rotor.

I claim:

1. A power transmission apparatus comprising:
   (a) a body,
   (b) a pinion gear mounted for rotation about a pinion axis relative to the body,
   (c) a cam means having curved inner and outer surfaces, the cam means and the pinion gear being mounted for relative rotation therebetween,
   (d) first and second gear rack pairs, each gear rack pair having oppositely facing toothed gear racks which are spaced apart sufficiently to receive the pinion gear and cam means therebetween when the pinion gear fully engages at least one of the toothed gear racks, and the outer surface of the cam means is generally adjacent at least one of the oppositely facing toothed gear racks,
   (e) first and second rack support means for supporting the first and second gear rack pairs respectively against lateral movement of the rack pair relative to the respective support means so as to ensure full engagement between the pinion and respective racks sequentially as required,
   (f) a rotor mounted for rotation about a rotor axis, the rotor having rotor engaging means for engaging the first and second rack support means so as to transmit power therebetween.

2. A power transmission apparatus as claimed in claim 1 in which:
   (a) each rack support means has a pair of parallel outer bearing surfaces disposed on opposite sides of the respective rack support means and spaced apart on opposite sides of the pinion,
   (b) each toothed gear rack has an outer bearing surface disposed on an edge opposite to teeth of the rack, the outer bearing surface of the gear rack being in engagement with an outer bearing surface of a respective rack support means.

3. A power transmission apparatus as claimed in claim 2 in which:

(a) the toothed racks of each pair have oppositely disposed rack end portions, (b) each rack support means has a pair of parallel recesses disposed on opposite sides of the respective rack support means and spaced apart on opposite sides of the pinion, each recess retaining a respective gear rack and having a respective outer bearing surface to engage the outer bearing surface of a respective gear rack, each recess also having a pair of oppositely spaced recess end portions for receiving the rack end portions of the respective rack.

4. A power transmission apparatus as claimed in claim 3 in which:

(a) each rack recess has a length greater than length of the respective rack retained therein, (b) resilient means cooperate with the rack support means and the rack to resiliently mount the rack for longitudinal movement relative to the respective rack recess.

5. A power transmission apparatus as claimed in claim 4 in which:

(a) the resilient means centers a respective gear rack within a respective recess.

6. A power transmission apparatus claimed in claim 5 in which:

(a) the resilient means includes a resilient member mounted at each end of each rack, each resilient member cooperating with an adjacent end portion of the rack recess so as to apply an inwards axial force to the rack, the inwards force at one end of the rack being opposed by an opposite inwards force from an opposite end of the rack tending to center the rack within its recess.

7. A power transmission apparatus as claimed in claim 3 in which:

(a) each end portion of each recess has an inner edge portion disposed generally oppositely to the outer bearing surface of the rack recess, space between an inner edge portion and an adjacent and opposite outer bearing surface of the respective recess being essentially equal to width of a respective end portion of the rack, so as to essentially prevent the lateral movement of the rack relative to the rack recess.

8. A power transmission apparatus as claimed in claim 3 in which:

(a) the racks have respective thicknesses defined by space between outer and inner side faces thereof, (b) each rack support means has a thickness defined by spaces between opposite side faces thereof, and each recess of the rack support means has a depth less than thickness of the rack support means, each recess having a recess rear face portion which engages an inner side face of a respective rack, the rear face portion having a thickness no greater than difference between the thickness of the rack support means and the thickness of the rack, so that when the rack is received in the respective rack recess, the outer side face of the rack is generally flush with an adjacent outer face of the rack support means.

9. A power transmission apparatus as claimed in claim 1 in which:

(a) each rack support means has oppositely disposed driving sides disposed generally normally to the rack pairs mounted thereon, each driving side having a driving side inner portion and two driving side outer portions spaced on opposite sides of the respective driving side inner portion, the driving side outer portions projecting outwardly further from the respective driving side inner portions relative to the pinion.

10. A power transmission apparatus as claimed in claim 9 in which:

(a) a resultant force vector from contact between the pinion and the respective rack passes closely adjacent a point of contact between an adjacent driving side outer portion and the respective engaging surface of the rotor.

11. A power transmission apparatus as claimed in claim 1 in which:

(a) the pinion gear and gear racks each have teeth, some of which having obliquely inclined tooth tips which generate forces on each other if opposing tooth tips contact each other momentarily prior to full engagement with each other, the oblique forces shifting the rack teeth generally tangentially relative to the pinion teeth immediately prior to engagement so as to facilitate meshing of the teeth.

12. An apparatus as claimed in claim 11 in which:

(a) each tooth with an obliquely inclined tooth tip has a main longitudinal axis, and the tip has a tip end face which is inclined at an angle to the main axis within a range of between 85 degrees and 45 degrees.

13. A power transmission apparatus as claimed in claim 1 further including:

(a) a pinion shaft mounting the pinion gear for mutual rotation about the pinion axis relative to the body, (b) a cam mounting means journalling the pinion shaft and connected to the cam means so that the inner surface of the cam means is at a fixed distance from the pinion gear axis, so as to permit teeth of the pinion gear to clear the inner surface of the cam means during the relative rotation therebetween.

14. A power transmission apparatus as claimed in claim 13 in which:

(a) the body includes inner and outer body sides which are spaced apart sufficiently to receive therebetween the first and second gear rack pairs, the pinion gear and the rotor, the body sides engaging the rotor to permit relative movement therebetween and having aligned central openings to receive the pinion shaft to pass therethrough.

15. A power transmission apparatus as claimed in claim 13 further characterized by:

(a) a gear ratio change means for varying spacing between the rotor axis and the pinion axis so as to vary gear ratio between the pinion shaft and the rotor, the gear ratio change means cooperating with the rotor and the pinion gear, (b) the gear ratio change means including a rotor mounting means which cooperates with the cam mounting means to permit relative movement between the cam mounting means and the rotor mounting means, (c) the rotor being journalled on the rotor mounting means for relative rotation about the rotor axis.

16. A power transmission apparatus as claimed in claim 1 in which:

(a) the rotor has an annular bearing surface concentric with the rotor axis, and the transmission further includes:

(b) a rotor mounting means having a rotor mounting surface complementary to the annular bearing surface of the rotor for mounting the rotor thereon, the rotor mounting means being non-rotatably located relative to the cam means.

17. A power transmission apparatus comprising:
(a) a body,
(b) a pinion gear mounted for rotation about a pinion axis relative to the body,
(c) a cam means having curved inner and outer surfaces, the cam means and the pinion gear being mounted for relative rotation therebetween,
(d) first and second gear rack pairs, each gear rack pair having oppositely facing toothed gear racks which are spaced apart sufficiently to receive the pinion gear and cam means therebetween when the pinion gear fully engages at least one of the toothed gear racks, and the outer surface of the cam means is generally adjacent at least one of the oppositely facing toothed gear racks,
(e) first and second rack support means for supporting a respective pair of racks, each rack support means having oppositely disposed driving sides disposed generally normally to the rack pairs mounted thereon, each driving side having a driving side inner portion and two driving side outer portions spaced on opposite sides of the respective driving side inner portion, the driving side outer portions projecting outwardly further from the respective driving side inner portion relative to the pinion,
(f) a rotor mounted for rotation about a rotor axis, the rotor having four engaging surfaces disposed as a square about the rotor axis, the two driving side outer portions of each rack support means engaging respective engaging surfaces of the rotor to permit relative movement along the engaging surfaces.

18. A power transmission apparatus as claimed in claim 17 in which:
(a) a resultant force vector from contact between the pinion and a respective gear rack passes closely adjacent a point of contact between an adjacent driving side outer portion and the respective engaging surface of the rotor.

19. A power transmission apparatus as claimed in claim 17 in which:
(a) the rotor has a generally square recess having four sides which serve as the four engaging surfaces which contact driving sides of each rack support means.

20. A power transmission apparatus claimed in claim 17 in which:
(a) the driving sides of each rack support means are generally concave so as to extend smoothly inwardly to the driving side inner portion from the two driving side outer portions thereof.

21. A power transmission apparatus as claimed in claim 17 in which:
(a) the rack support means are generally rectangular, with a pair of oppositely disposed interconnecting sides which interconnect the respective driving sides of the respective rack support means, each rack support means having a thickness, the rack support means being disposed with faces thereof closely adjacent each other,
(b) the engaging surfaces of the rotor have a width at least equal to sum of the thicknesses of the first and second rack support means so as to provide adequate engagement therewith.

22. A power transmission apparatus as claimed in claim 17 in which:
(a) each rack support means has a thickness defined by space between opposite side faces thereof, and each recess of the rack support means has a depth less than the thickness of the rack support means, each recess having a recess rear face portion which engages an inner side face of a respective rack, the rear face portion having a thickness no greater than difference between thickness of the rack support means and thickness of the rack,
so that when a rack is received in the rack recess, an outer side face of the rack is generally flush with an adjacent face of the rack support means.

23. A power transmission apparatus as claimed in claim 17 in which:
(a) the driving side outer portions have bearing means to reduce friction and wear between the rack support means and the engaging surfaces of the rotor.

24. A power transmission apparatus as claimed in claim 23 in which:
(a) the bearing means includes a roller journalled for rotation relative to the rack support means and adapted to contact the engaging surface of the rotor.

25. A power transmission apparatus comprising:
(a) a body,
(b) a pinion gear mounted for rotation about a pinion axis relative to the body,
(c) a cam means having curved inner and outer surfaces, the cam means and the pinion gear being mounted for relative rotation therebetween,
(d) first and second gear rack pairs, each gear rack pair having oppositely facing toothed gear racks which are spaced apart sufficiently to receive the pinion gear and cam means therebetween when the pinion gear fully engages at least one of the toothed gear racks, and the outer surface of the cam means is generally adjacent at least one of the oppositely facing toothed gear racks,
(e) first and second rack support means for supporting a respective pair of racks,
(f) a rotor mounted for rotation about a rotor axis, the rotor having rotor engaging means for engaging the rack support means so as to transmit power therebetween,
(g) the pinion gear and the gear racks each having teeth, some of which having obliquely inclined tooth tips so as to generate oblique forces on each other if opposing tooth tips contact each other momentarily prior to full engagement with each other, the oblique forces shifting the rack teeth generally tangentially relative to the pinion teeth immediately prior to engagement so as to facilitate meshing of the teeth.

26. A power transmission apparatus as claimed in claim 25 in which:
(a) each tooth with an obliquely inclined tooth tip has a main longitudinal axis, and the tip has a tip end face which is inclined at an angle to the main axis within a range of between 85 degrees and 45 degrees.

27. A power transmission apparatus as claimed in claim 25 in which:
(a) the tip end faces of the teeth are generally straight, and radiused at opposite ends thereof to blend smoothly with adjacent faces of the teeth.

28. An apparatus as claimed in claim 25 in which:

(a) the cam means has an inner curved surface which is concentric with the pinion axis, and an outer curved surface which has a geometrical profile reflecting a locus of points of contact of the cam and the tooth tips of a non-engaged rack sweeping past and contacting the outer surface, while a remaining rack is engaged by the pinion means.

29. A power transmission apparatus as claimed in claim 27 in which:
(a) the tip end face of each pinion tooth has a leading and trailing end portion with respect to direction of rotation of the pinion gear, the leading end portion being at a greater radial distance from the pinion axis than the trailing end portion.

30. A power transmission apparatus as claimed in claim 29 in which:

(a) the cam means has an inner curved surface which is concentric with the pinion axis, and an outer curved surface which has a geometrical profile reflecting a locus of points of contact of the cam and the tooth tips of a non-engaged rack sweeping past and contacting the outer surface, while the remaining rack is engaged by the pinion means,
(b) the cam means has leading and trailing ends with respect to the pinion rotation, the leading end being approached and passed by a particular pinion tooth prior to the trailing end of the cam means,
(c) the curved outer surface of the cam means is disposed at a greater radial distance from the pinion axis adjacent the leading end thereof than adjacent the trailing end thereof.

* * * * *